United States Patent [19]

Huntoon

[11] 4,427,998

[45] Jan. 24, 1984

[54] APPARATUS FOR ADJUSTING A FACSIMILE DOCUMENT SCANNER

[75] Inventor: Francis E. Huntoon, Des Plaines, Ill.

[73] Assignee: Teletype Corporation, Skokie, Ill.

[21] Appl. No.: 368,618

[22] Filed: Apr. 15, 1982

[51] Int. Cl.$^3$ .............................................. H04N 1/10
[52] U.S. Cl. .................................. 358/294; 358/285; 358/293
[58] Field of Search ................ 358/293, 294, 285, 256

[56] References Cited

U.S. PATENT DOCUMENTS

| | | | |
|---|---|---|---|
| 3,584,144 | 6/1971 | Shepard | 358/293 |
| 4,081,842 | 3/1978 | Harbaugh | 358/294 |
| 4,318,135 | 3/1982 | Allis | 358/293 |
| 4,358,794 | 11/1982 | Kurakami | 358/294 |

*Primary Examiner*—Howard Britton
*Attorney, Agent, or Firm*—W. K. Serp; J. C. Albrecht

[57] ABSTRACT

A facsimile document scanner 10 is illustrated which includes an optical system 23 having a folded optical path 40 and an adjustable focusing lens 42. A test pattern 60 in the form of a plurality of alternate light and dark stripes 64, 66 is printed upon a strip 62 secured to the inner wall of the cabinet 12. When the scanner is at rest, the test pattern 60 is focused upon a linear photodiode array 50 mounted in an integrated circuit pack 51. The number of light and dark stripes 64, 66 is equal to the number of photodiodes in the linear photodiode array 50 across the document width. For adjustment purposes, an oscilloscope 70 is connected to a serial output from the integrated circuit pack 50 and the optical system 23 is adjusted to obtain a uniform signal display 80.

5 Claims, 7 Drawing Figures

APPARATUS FOR ADJUSTING A FACSIMILE DOCUMENT SCANNER

DESCRIPTION

1. Technical Field

This invention relates to a method and apparatus for adjusting a facsimile document scanner.

2. Background Art

In facsimile systems, various types of apparatus have been suggested for optically scanning a document and for converting the information on the document into electrical signals for transmission to a receiving device which produces a copy of the original document. In such document scanners, the document is placed on a flat transparent pane providing a document support surfaace and the scanning mechanism views the document through the pane. The scanning mechanism includes an optical system for focusing selected portions of the document upon photosensitive cells which generate electrical signals related to the light level falling upon the cells. A particular problem with such document scanners is the difficulty of adjusting the optical system and the position of the photosensitive cells to obtain the desired size, focus and location of the image upon the photosensitive cells. The apparatus disclosed provides rapid, accurate and convenient adjustment of a facsimile document scanner.

DISCLOSURE OF THE INVENTION

In accordance with this invention, a fascimile scanner comprises a cabinet which has a plurality of walls and a rectangular opening in a first wall thereof. The first wall has inner and outer surfaces. A transparent pane document support table covers the opening. An elongated flat strip with a surface thereof displays test indicia. The strip is secured to the inner surface of the first wall of the cabinet adjacent one edge of the opening with the indicia facing toward the interior of the cabinet. A movable scanning assembly is mounted within the cabinet. An adjustable optical system is included for focusing onto a linear photodiode array an image of portions of documents placed upon the pane and the test indicia for generating electrical signals related to the information on the scanned document and the test indicia.

Preferably, the transparent pane is mounted on the interior surface of the first wall so that the outwardly disposed surface of the pane and the inner surface of the wall lie generally on a common plane. Thus, the display surface of the test strip and the surface of the pane whereon a document is supported are generally on a common plane. The strip is oriented with its long dimension normal to the path of movement of the scanning assembly.

Further, the scanning assembly has a rest position whereat the optical system receives light reflected from the indicia on the strip. The optical system includes a diode array having a plurality of photo cells in a linear side by side arrangement. The long dimension of the diode array is oriented parallel to the long dimension of the strip. The indicia comprise a plurality of equally sized alternate light reflecting and light absorbing stripes.

THE DRAWING

DETAILED DESCRIPTION

Figure 1:
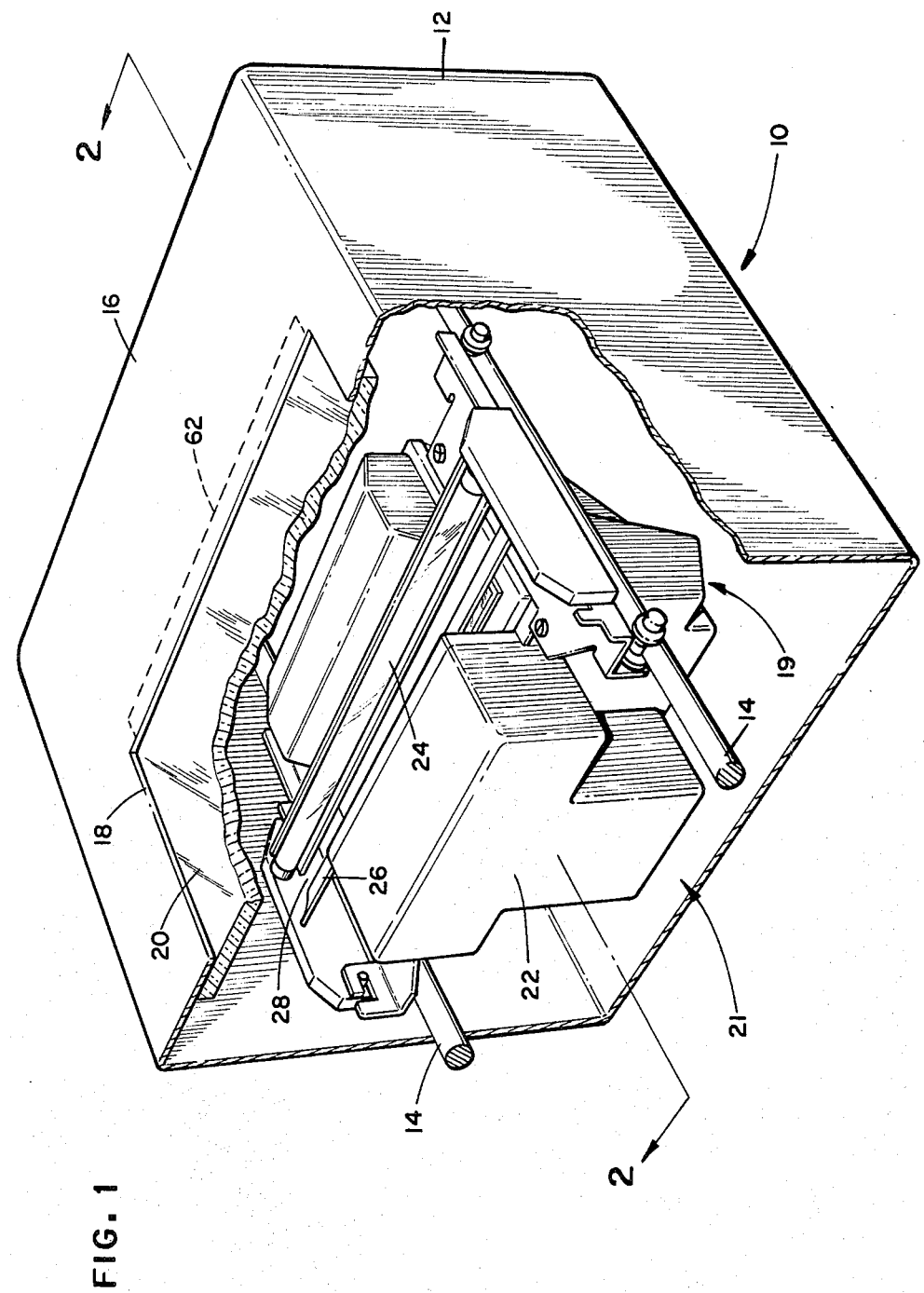
FIG. 1 is a perspective view of a facsimile document scanner with a portion of the cabinet removed to more clearly show certain features thereof.

In FIG. 1, a document scanner 10 is shown which includes a cabinet 12 having firmly mounted therein a pair of guide rails 14. The top wall 16 of the cabinet 12 has a rectangular opening 18 covered with a transparent glass pane 20 providing an outwardly disposed document support surface. A scanning assembly 21, including an optical housing 22, is supported on and driven along the rails 14 by a motor (not shown). The scanning assembly 21 has a light source in the form of a bulb 24 for illuminating a selected portion of the document to be scanned. The bulb 24 is positioned within a reflector 26. The reflector 26 has a slit 28 along its length through which the light reflected from the document passes into the housing 22 through a viewing aperture 30 (FIG. 2).

Figure 2:
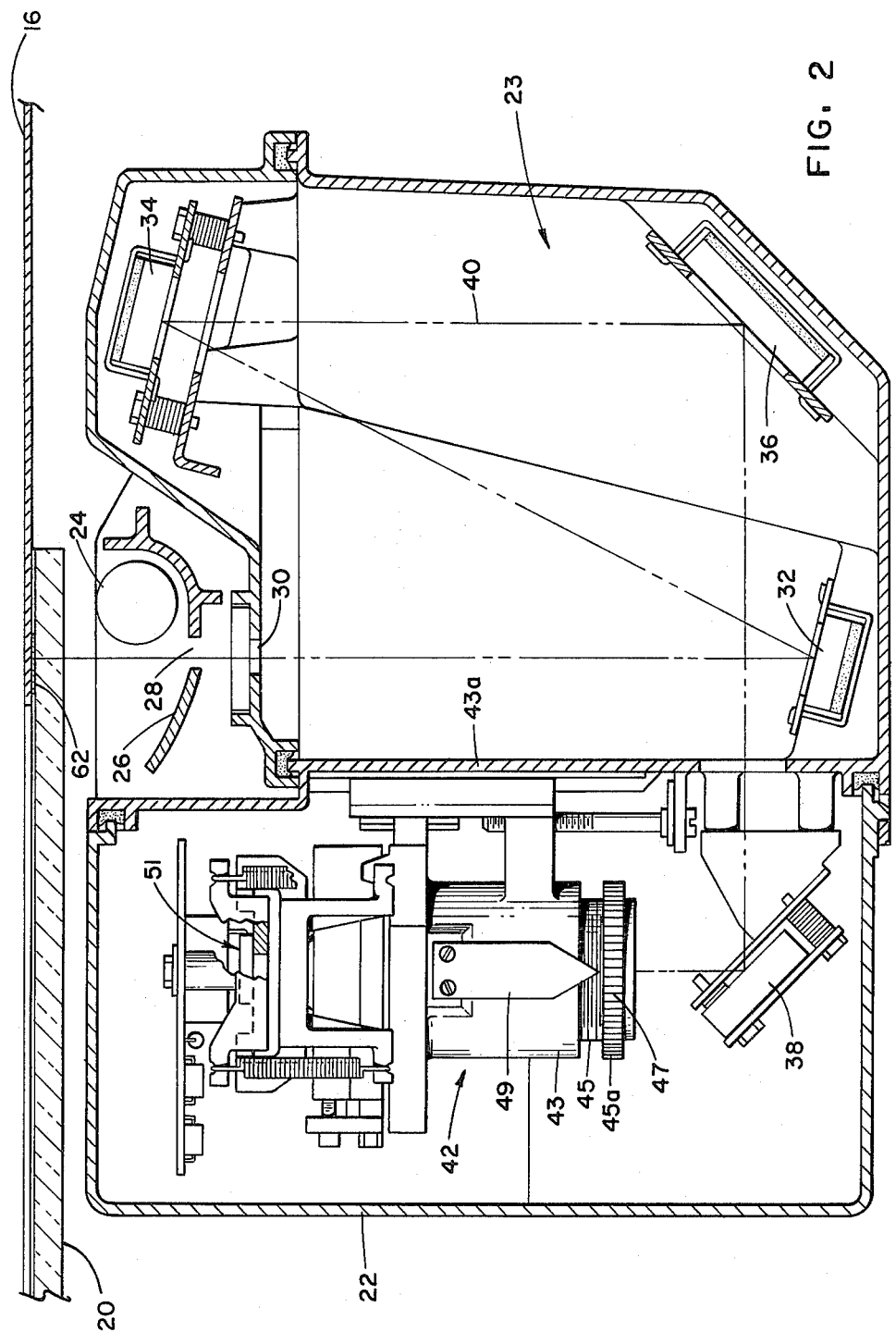
FIG. 2 is a full sectional view of a portion of the facsimile document scanner of FIG. 1 taken along the line 2—2 of FIG. 1 and with the carriage assembly in its rest position.

As particularly shown in FIG. 2, there is within the housing 22 an optical system 23 which includes four front surface mirrors 32, 34, 36 and 38 to form a folded optical path symbolically illustrated by a phantom line 40. A suitable mounting apparatus for the mirrors 32, 34, 36 and 38 is described in U.S. patent application Ser. No. 06/201,896 filed Oct. 29, 1980 in the name of F. E. Huntoon entitled, "An Apparatus For Mounting A Mirror", now U.S. Pat. No. 4,372,519, and having a common assignee with this application. The mirrors 32 and 36 are maintained in a fixed position while the mirrors 34 and 38 are movable to allow accurate positioning of the optical path 40 into an adjustable lens assembly 42 mounted to an inner wall 43a of the housing 22. The mirrors 32, 34, 36 and 38 direct the reflected light which enters through the aperture 30 into the adjustable lens assembly 42. The adjustable lens assembly 42 includes a housing 43 mounted to the wall 43a as well as a threaded cylindrical lens holder 45 which screws into the lens housing 43. For positioning the lens holder 45 with respect to the lens housing 43, a ring 45a of the holder 45 has a plurality of spaced ridges 47 about its periphery. A reference pointer 49 is secured to the lens housing 43. Thus, the user can easily determine the amount of rotational movement of the lens holder 45 with respect to the housing 43 by counting the number of ridges 47 which pass the pointer 49 during rotation of the holder 45. A more detailed discussion of the structural operation of the lens assembly 42 is provided in U.S. patent application in the name of N. Jacobs et al., entitled "Method and Apparatus for Adjusting a Facsimile Document Scanner" and filed simultaneously herewith Ser. No. 06/368,619. The optical system 23 is adjusted to focus the document image onto a linear photodiode array 50 (FIG. 3) having a plurality of photocells 50a mounted within an integrated circuit pack 51. One particular photodiode array found suitable for this application is composed of 1728 close spaced, photosensitive cells positioned in a straight line. When the image of a document 215 mm. (i.e. approximately 8½ inches) wide is focused on the photodiode array 50, the resolution is approximately eight lines per milimeter in accordance with the International Telegraph & Telephone Consulative Committee (CCITT) facsimile standards. Such an integrated circuit package is manufactured and sold by Fairchild Corporation and designated as part #CCD122H. As mentioned, photodiode array 50 is mounted within an integrated circuit package 51 which also includes a sampling circuit (not shown). The sampling circuit, in response to a control signal, samples the signal levels at each of the photodiodes in the array placing the sampled signal levels into a parallel to serial shift register wherefrom the signal levels are shifted serially to suitable processing circuitry (not shown).

To obtain the desired size and focus of the image upon the photo-diode array 50, the optical system 23 must be carefully adjusted to focus the full width of the document image across on the photodiode array 50. Additionally, the location of the integrated circuit package 51 is adjustable in all directions to facilitate placing the photodiode array 50 at the location of the image. Adjustment of the optical system 23 is attained with the aid of a test pattern 60 on a strip 62 fixed to the inside of the top wall 16 of the cabinet 12 adjacent the opening 18.

As shown, the strip 62 displaying the test pattern indicia, is secured to the inside top wall 16 of the housing along one edge of the opening 18. The longitudinal dimension of the strip is oriented generally normal to the path of movement of the scanning assembly 21 and parallel to the axis of the linear diode array 50. It will be appreciated that, in this particular location, the test pattern 60 is not visible to the user nor does the strip obstruct any portion of the pane 20. Further, in this position, the test pattern 60 and the outwardly disposed surface of the pane 20 upon which a document (not shown) is placed lie upon a common plane. Thus, once the lens assembly is adjusted to focus the test pattern 60, it will be focused for a docment placed in the pane 20. In prior arrangements, a test pattern printed upon a sheet of paper which is placed upon a transparent support surface. The paper is then carefully positioned to assure that the test pattern is in exact alignment with the optical system of the scanner and carefully oriented parallel to the axis of the linear diode array. In the illustrated embodiment, such alignment is automatically attained when the scanner is in its rest position, as shown in FIG. 2. The scanning assembly 21, when in the rest or non-scanning position, is located at the far right of the cabinet 12 as shown in FIG. 2 and, when located in this position, the test pattern 60 is located directly above the viewing aperture 30 in the housing 22.

Figure 3:
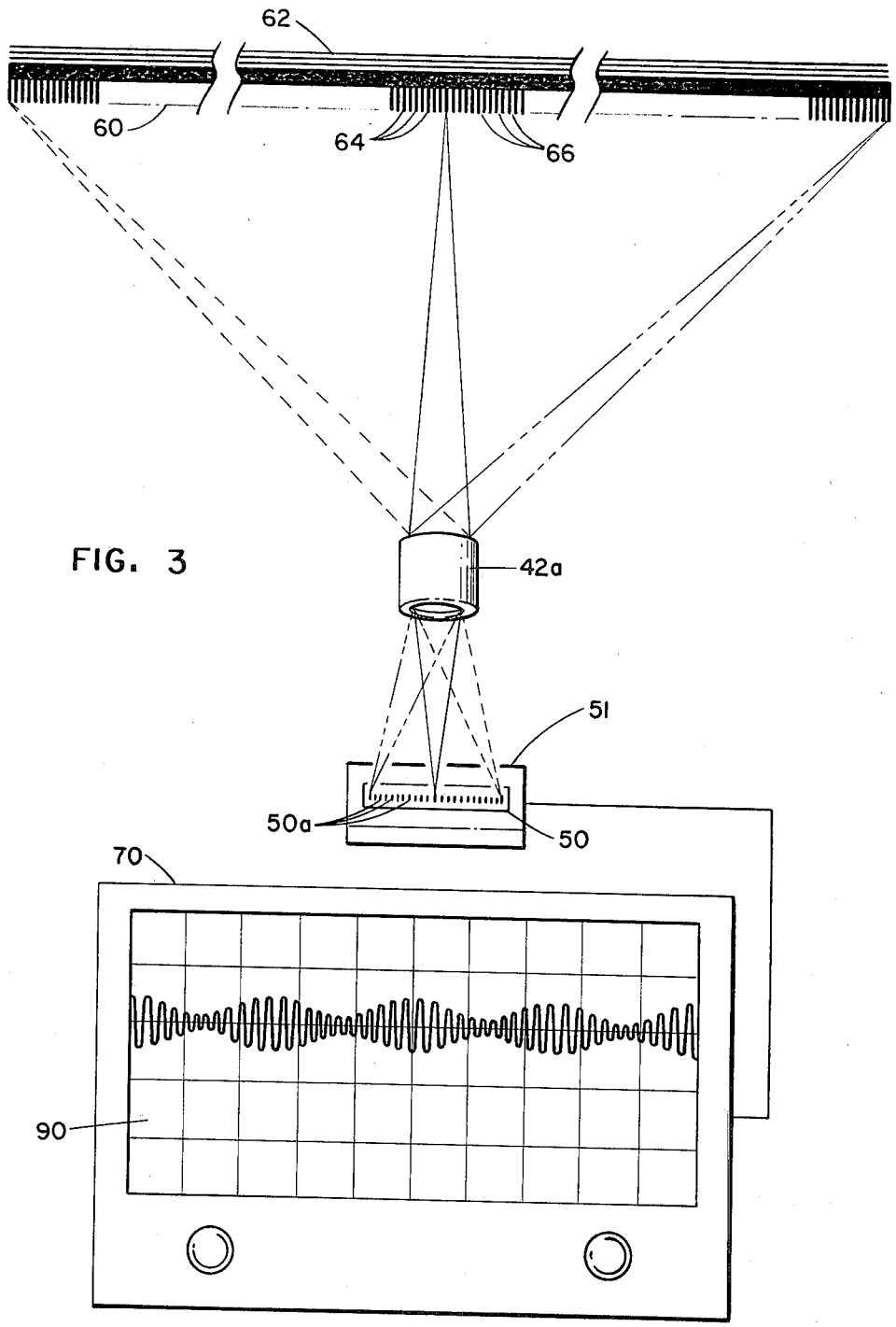
FIG. 3 is a schematic diagram of the optical system of the document scanner of FIG. 1 in combination with an oscilloscope.

As illustrated in FIG. 3, the test pattern 60 is printed upon an elongated strip 62 of paper, mylar or other suitable material and preferably has an adhesive coated back surface to facilitate securing the strip to the inside surface of the top wall 16 of the cabinet 12. The pattern 60 displays a series of alternating light absorbing 64 and light reflecting 66 transverse stripes. All of the stripes 64, 66 are of equal width. The stripes 64, 66 are sized so that over a distance of 215 mm, 1728 alternate dark 64 and light 66 stripes are printed. As shown, the strip 62 also has printed thereon other test pattern indicia 69 used for additional scanner tests.

To facilitate adjustment of the scanner 10, an oscilloscope 70 is connected to the serial output pin of the integrated circuit pack 51. FIGS. 4, 5, 6 and 7 illustrate the output signals from the integrated circuit package 51 to the oscilloscope 70 corresponding to four adjustment conditions. The horizontal sweep rate of the oscilloscope 70 is adjusted so that it is equal to the time interval during which one complete diode array 50 output will be displayed. FIGS. 4, 5, 6 and 7 illustrate only a small portion of the signal output from the circuit package 51 during one scan of the test pattern.

Figure 4:
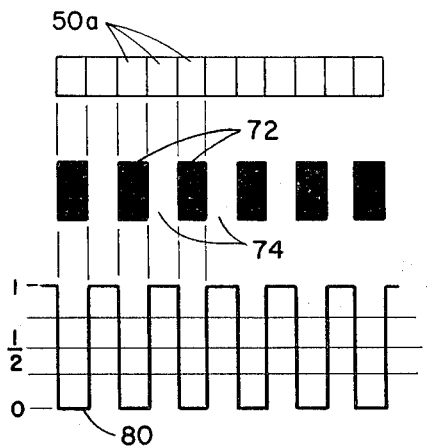
FIGS. 4, 5, 6 and 7 are presentations of selected condition created by representative adjustment conditions of the document scanner of FIG. 1.
Figure 5:
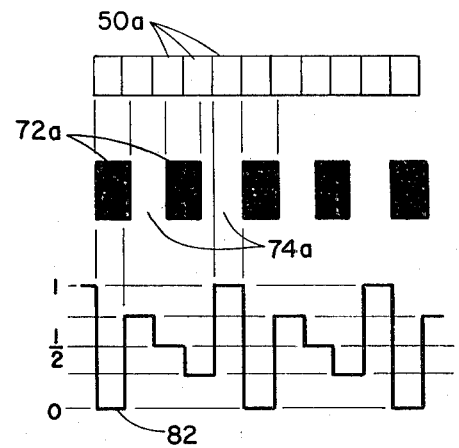
Figure 6:
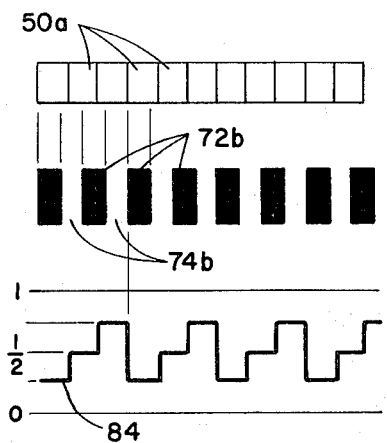
Figure 7:
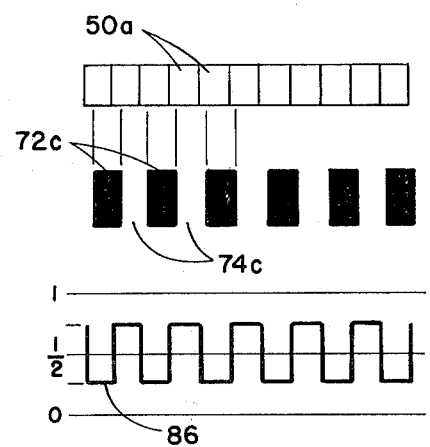

FIG. 4 illustrates the desired condition with image stripes 72, 74 of the pattern 60 symbolically illustrated in perfect registration with the photocells of the photodiode array 50. When the image of the test pattern 60 is precisely focused upon the photodiode array 50, the dark and light image stripes 72, 74 will fall exactly upon alternate photocells 50a of the photodiode array 50 and a symmetrical wave shape signal 80 of maximum amplitude (FIG. 4) will be fed into the oscilloscope 70 for display. In FIG. 5, the adjustable lens assembly 42 is not properly adjusted so that the image of each of the stripes 72a, 74a is wider than each of the photocells 50a of the photodiode array 50 resulting in the illustrated nonsymmetrical wave signal 82 being fed to the oscilloscope 70. In this instance, the stripes 72a, 74a are illustrated as being twenty-five percent wider (an extreme condition) than the width of a photocell 50a of the photodiode array 50. FIG. 6 illustrates the condition wherein the size of the image stripes 72b, 74b of the pattern 60 upon the photodiode array 50 are narrower than the width of the photocells 50a by approximately twenty-five percent. This condition generates the illustrated wave shape 84. FIG. 7 illustrates the condition wherein the width of the image stripes 72c, 74c of the pattern 60 are equal in width to the width of the photocells 50a of the photodiode array 50. However, the image stripes 72c and 74c are not in registration with the photocells 50a. Under this condition, the signal to the oscilloscope 70 is uniform but reduced in amplitude when compared to the signal illustrated in FIG. 4 which shows the desired alignment condition.

In FIG. 3, a full screen representation 90 of the oscilloscope 70 is illustrated with a horizontal sweep rate corresponding to the time interval for one scan output of the linear array 50. As illustrated, the representation is that of a high frequency signal modulated by a much lower frequency signal. The low frequency signal represents an optical misalignment of a few percent. Once the adjustment of the optical system 23 is relatively close such as shown in FIG. 3, the operator visually counts the low frequency signal and makes the necessary adjustments to eliminate the low frequency signal. As further described in the aforementioned N. Jacob's et al application previously mentioned.

Although this invention has been shown and described with reference to a preferred embodiment thereof, it will be understood that various changes in form and detail may be made without departing from the scope and spirit of the invention as defined by the following claims.

What is claimed is:

1. In combination with a facsimile scanner (10) comprising a cabinet (12) having a plurality of walls and a generally rectangular opening (18) in a first wall (16) thereof, said first wall (16) having an inner and an outer surface, a transparent pane (20) document support table covering said opening (18), an elongated flat, thin strip

(62) with one surface thereof displaying test indicia (64, 66), said strip (62) being secured to the inner surface of said first wall (16) of said cabinet (12) adjacent one edge of said opening (18) with said indicia (64, 66) facing toward the interior of the cabinet (12), a movable scanning assembly (21) mounted within said cabinet (12), an adjustable optical system (23) for focusing onto a linear photodiode array (50), an image of portions of documents placed upon the pane (20) and said test indicia for generating electrical signals related to the information on the scanned document and said test indicia.

2. The apparatus of claim 1 wherein said transparent pane (20) is mounted to the interior surface of said first wall 16, the outwardly disposed surface of said pane (20) and the inner surface of said first wall 16 lie generally on a common plane so that the indicia (64, 66) on said test strip (62) and the surface of the pane (20) whereon a document is supported are also on a common plane and the long dimension of said elongated strip (62) is normal to the path of movement of said scanning assembly (21).

3. The apparatus of claim 1 or claim 2 wherein said scanning assembly (21) has a rest position whereat the optical system (23) receives light reflected from said test indicia (64,66) on said strip (62).

4. The apparatus of claim 3 wherein said optical system includes a diode array (50) having a plurality of photocells (50a) in a linear side by side arrangement, the long dimension of said diode array being oriented parallel to the long dimension of said strip (62).

5. The apparatus of claim 4 wherein said test indicia (64, 66) comprise a plurality of equally sized alternate light reflecting and light absorbing stripes distributed over one width of the document to be scanned, the number of said light reflecting and light absorbing stripes (64,66) being at least as great as the number of photocells (50a) in said diode array (50).

* * * * *